April 19, 1966  J. L. GYLLENBERG  3,246,512
DOUBLE FULCRUM BALANCE TESTING APPARATUS
Filed March 26, 1963  2 Sheets-Sheet 1
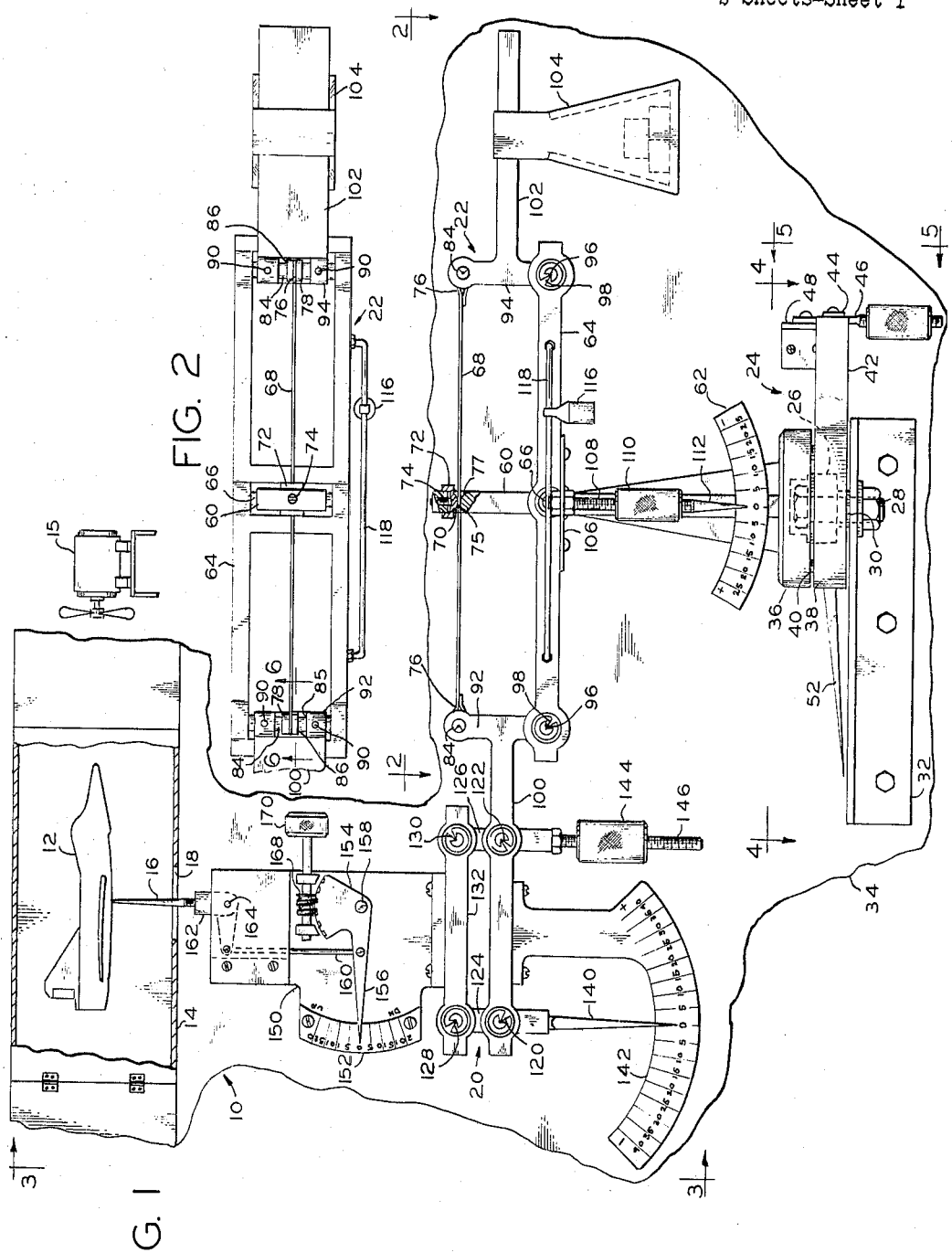
INVENTOR.
JOHN L. GYLLENBERG
BY
BUCKHORN, BLORE, KLARQUIST & SPARKMAN
ATTORNEYS April 19, 1966  J. L. GYLLENBERG  3,246,512
DOUBLE FULCRUM BALANCE TESTING APPARATUS
Filed March 26, 1963  2 Sheets-Sheet 2
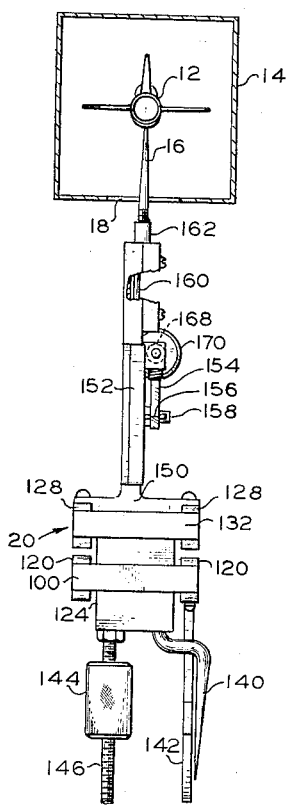
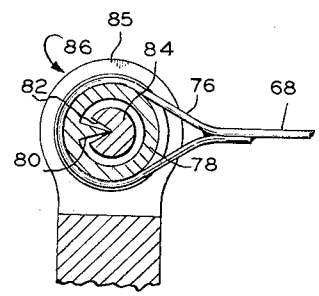
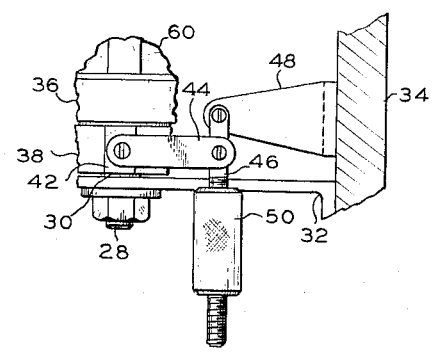
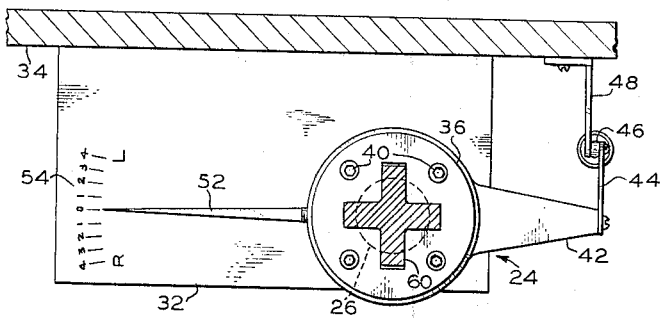
INVENTOR.
JOHN L. GYLLENBERG
BY
BUCKHORN, BLORE, KLARQUIST & SPARKMAN
ATTORNEYS

United States Patent Office

3,246,512
Patented Apr. 19, 1966

3,246,512
DOUBLE FULCRUM BALANCE TESTING
APPARATUS
John L. Gyllenberg, 3590 Cedar St., Baker, Oreg.
Filed Mar. 26, 1963, Ser. No. 268,084
12 Claims. (Cl. 73—147)

This invention relates to a double fulcrum balance testing apparatus, and more particularly to an apparatus for testing lift, drag and yaw of an airfoil.

An object of the invention is to provide an apparatus for testing each of several components of a force independently of the other components.

Another object of the invention is to provide an apparatus for testing individually drag and lift of an airfoil with no effect of one upon the other.

A further object of the invention is to provide an apparatus for measuring different components of forces on an airfoil without changing the position of the airfoil relative to a testing airstream applied to the airfoil.

Still another object of the invention is to provide a testing apparatus in which each of several components of a force to be measured is measured directly without intervening linkages.

Yet another object of the invention is to provide a double fulcrum balance testing apparatus having simple, effective knife edge pivots and using no springs or motors.

A still further object of the invention is to provide a flight testing apparatus with a simplicity of design such as to permit measurement of flight and propulsion of airfoils of the smallest dimension such as, for example, that of an insect.

The invention provides a double fulcrum balance testing apparatus having a force sensing member movable in accordance with the magnitude and direction of a force to be measured together with a first measuring mechanism supporting the force sensing member, resisting movement of the member in a direction of one component of the force to be measured and measuring the magnitude of the component. A double fulcrum balance measuring mechanism supports the first measuring mechanism and measures the magnitude of a second component of the force to be measured. In a testing apparatus forming one embodiment of the invention, the first measuring mechanism also is a double fulcrum balance for measuring a horizontal component of the force, and the other double fulcrum balance is arranged to measure the vertical component of the force and is mounted for turning movement on a vertical axis by a third measuring mechanism adapted to measure a second horizontal component of the force.

A complete understanding of the invention may be obtained from the following detailed description of a double fulcrum balance testing apparatus forming a specific embodiment thereof, when read in conjunction with the appended drawings, in which:

FIG. 1 is a fragmentary, front elevation view of a double fulcrum balance testing apparatus forming one embodiment of the invention with portions thereof shown in section;

FIG. 2 is a fragmentary, top plan view taken along line 2—2 of FIG. 1;

FIG. 3 is a vertical sectional view taken along line 3—3 of FIG. 1;

FIG. 4 is a fragmentary, horizontal sectional view taken along line 4—4 of FIG. 1;

FIG. 5 is a fragmentary, vertical sectional view taken along line 5—5 of FIG. 1; and FIG. 6 is an enlarged, fragmentary, vertical sectional view of a portion of the double fulcrum balance testing apparatus of FIG. 1 taken along line 6—6 of FIG. 2.

Referring now in detail to FIGS. 1 to 5 of the drawings, a double fulcrum balance testing apparatus 10 is designed to measure drag, lift and yaw of an airfoil 12 mounted in a wind tunnel 14, which forms along with a fan 15 a mechanism for applying an airstream of known velocity normally applied to the airfoil in a direction toward the left as viewed in FIG. 1. The airfoil is mounted rigidly on a tapered rod 16 projecting through a clearance slot 18 in the wind tunnel and supported adjustably by a double fulcrum balance 20. The balance 20 measures drag which is the horizontal component of the force on the airfoil parallel to the longitudinal axis of the airfoil. The balance 20 is supported by one end of a double fulcrum balance 22, which measures lift which is the vertical component of the force applied to the airfoil. A pendulum balance 24 mounts the balance 22 for turning movement on a vertical axis and measures the side or yaw component of force on the airfoil.

The pendulum balance 24 is supported by the outer race of a radial-and-thurst bearing 26, the inner race of which is clamped by a bolt 28 and a spacer 30 in a vertical position on a bracket 32 fixed to a vertical mounting plate 34. A pair of opposed disc-like members 36 and 38 are clamped by screws 40 against opposite ends of the outer race of the bearing 26 and are supported rotatably thereby. An arm 42 of the member 38 is connected by a link 44 to a pendulum arm 46 suspended pivotally from a bracket 48 on the plate 34. A pendulum weight 50 is mounted adjustably on the arm 46. A pointer 52 (FIGS. 1 and 4) carried rigidly on the member 38 is movable in either direction along a scale 54 from a zero position to indicate on the scale the direction and magnitude of the yaw component.

A post 60 (FIGS. 1, 4, and 5) having a base portion that is cross-shaped in cross-section is fixed rigidly to and keyed to the member 36 in a vertically extending position aligned with the bearing 26. An indicating scale 62 is fixed in a vertical plane to the base of the post 60. A lower beam 64 is supported at its center on knife edge connections or pivot supports 66 carried by the post 60, and a second, tension beam 68 of wire passes through a slot 70 in the upper end of the post 60 and is connected to the post for free pivotal movement relative to the post at the center of the beam 68 by a pad 72 and set screw 74. The pad has a rounded cylindrical bottom surface 75 and with a cylindrical surface 77 clamps the beam 68 against longitudinal or endwise movement of the beam 68 relative to the post 60. The beam 68 is a tension member and comprises a thin wire, preferably about .004 inch in diameter. The beam 68 has connecting eyes 76 (FIG. 6) at the ends thereof which clamp on sleeves 78 carrying knife members 80 engaging V-grooves 82 in rods 84 to form two knife edge pivot connections 86 of substantially the same construction as that of the knife edge pivot connections 66.

The rods 84 are keyed by pins 90 to the upper ends of rigid side or end links or beams 92 and 94, and four knife edge connections 96 similar to the connections 66 connect the lower ends of the links 92 and 94 to opposite ends of the beam 64 with minimum friction. Knife edges 98 are directed upwardly and outwardly from the ends of the beam 64, the upward inclination preferably being about 45° and being provided to take downward forces thereon as well as compressive forces longitudinally of the beam 64. An arm 100 of the link 92 extends perpendicularly therefrom and forms the bottom beam of the balance 20. An arm 102 of the link 94 carries a counterbalance weight 104, which may have weight added thereto or taken therefrom to balance the weight carried by the link 92. A plate 106 connects rigidly to the beam 64 a normally vertical pendulum rod 108 carrying a pendulum weight 110 adjustably therealong. A pointer 112 on the end of the rod 108 is movable in either direction by lift components of the forces on the airfoil 12 to indicate on the scale 62 the magnitude and direction of such a lift component. The beams 64 and 68 and the links 92 and 94 form a parallelogram linkage and with the weights 104 and 110 form the double fulcrum balance 22 whose state of balance is unaffected by any horizontal shift of the load carried by the link 92 or the weight 104 along the arm 102. The operation and construction of balance 22 are generally the same as those of balances of the type known as the Roberval balance in which shift of the load relative to the pivot does not affect the state of balance. A weight 116 is adjustable along a horizontal rod 118 on the beam 64 for purposes of fine balance.

The arm or beam 100 pivotally supports two pairs of vertical knife edge connections 120 and 122 and a pair of parallel, normally vertical links or beams 124 and 126 of the double fulcrum balance 20. The upper ends of the links 124 and 126 are connected by two pairs of vertical knife edge connections 128 and 130 to an upper, tension beam 132 to form a parallelogram linkage with the beams 100 and 132. While the beam 132 is shown with four connections 128 and 130 to the links 124 and 126, one pair of connections to each link, the beam 132 can be mounted on the links 124 and 126 by only two knife edge pivot connections generally similarly to the mounting of the beam 68 on the links 92 and 94. A lightweight pointer 140 rigid on the link 124 is movable in either direction along a scale 142 carried by the beam 100 to indicate magnitude and direction of the drag component on the airfoil 12. An eccentric pendulum weight 144 is adjustably threaded on a pendulum arm 146 extending downwardly from one end of the link 126. The eccentric position of the weight 144 relative to the arm 146 may be adjusted to adjust the pointer 140 to zero if necessary to compensate for initial adjustment of the position of the airfoil 12. Thus, any initial change or adjustment of position of the airfoil 12 relative to the upper beam 132 may be simply compensated.

A vertically extending bracket 150 having a scale 152 is rigidly mounted on the beam 132, and a worm gear sector 154 having a pointer 156 is pivotally mounted on the bracket 150 by a pin 158. A link 160 connects the gear sector 154 to one end of a lever 162 mounted by a pin 164 pivotally on the bracket 150. The other end of the lever 162 rigidly carries the tapered rod 16 which is of minimum and known wind resistance. The upper end of the rod 16 is of known construction adapted to connect the airfoil 12 thereto in a fixed position relative to the rod 16. A worm 168 is operable manually by a knob 170 to adjust the inclination of the airfoil, which inclination is indicated by the pointer 156 on the scale 152.

In the operation of the testing apparatus 10, the airfoil 12 is mounted on the rod 16, the inclination is adjusted and weight is added to or taken from the weight 104. An airstream of known velocity is supplied to the tunnel 14. The drag component is measured by the balance 20 and the lift component is measured by the balance 22 which is entirely unaffected by any shift in horizontal position of the center of gravity of the parts carried by the beam 100. The lateral thrust on the airfoil 12 is measured by the pendulum balance 24. The airfoil will be maintained at its set inclination regardless of any shift in position of the airfoil due to lift or drag. Thus, there will be no change in these components from such change in position of the airfoil.

While the above-described apparatus is illustrated for testing reactions to airstreams, it is obvious that the object being tested may have a propulsion mechanism and the characteristics of the propulsion device and reactions thereto may be measured. Also, the testing apparatus can obviously be used to test other objects or forces which have several components. For example, an insect may be harnessed to the apparatus.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. In a testing apparatus,
force sensing means,
a measuring device movably supporting the force sensing means for measuring a first component of a force applied to the force sensing means,
and a double fulcrum balance supporting the measuring device and adapted to measure a second component of the force extending at an angle relative to the first component without error from movement of the force sensing means by the first component.

2. In a testing apparatus,
a sensing member adapted to be moved vertically and in a predetermined horizontal direction by a force applied thereto,
a first double fulcrum balance supporting the sensing member and resisting horizontal movement in said horizontal direction for measuring the horizontal component of said force,
and a second double fulcrum balance supporting the first balance and resisting vertical movement of the balance for measuring the vertical component of said force.

3. In a testing apparatus,
a force sensing means,
a plurality of double fulcrum balance mechanisms,
and means connecting the double fulcrum balance mechanisms angularly together in series with one another and connecting one of the mechanisms to the force sensing means to measure a plurality of angular components of a force to be tested which is applied to the force sensing means.

4. In a testing apparatus,
a first double fulcrum balance for measuring vertical force,
a second double fulcrum balance for measuring horizontal force,
means connecting the second balance to the first balance in a position in which the second balance is supported by the first balance,
means for connecting an airfoil to the second balance to support the airfoil thereon,
and means for applying horizontal and vertical forces to the airfoil whereby the second balance measures horizontal force and transmits vertical force to the first balance.

5. In a testing apparatus,
a first double fulcrum balance including parallelogram linkage having a vertical load receiving end and a counterbalance end and pivoted on horizontal axes at points positioned between the ends,
a pendulum tending to maintain the parallelogram linkage in a balanced condition,
means for indicating movement of the linkage from the balanced condition thereof,
a second double fulcrum balance including a second parallelogram linkage having a first beam rigidly connected to and supported by the load receiving end of the first parallelogram linkage and also including a second beam parallel to the first beam and parallel links connected pivotally to the first and second beams,
pendulum means tending to maintain the first and second links in vertical positions,
means for indicating movement of the first and second links from vertical positions,
and force receiving means for transmitting vertical and horizontal forces to the second beam.

6. The testing apparatus of claim 5 wherein the pendulum means includes an eccentric weight mounted adjustably on a vertical axis.

7. In a testing apparatus,
a double fulcrum balance including a parallelogram linkage having a generally horizontal first beam and having a load receiving portion and also including a second beam parallel to the first beam and generally vertical parallel links connected pivotally to the first and second beams, force-sensing means carried by the load receiving end,
and a pendulum weight connected to one of the vertical links eccentrically relative to said one of the vertical links and adjustable relative to said one of the vertical links to compensate for the force of the weight on the linkage of the force-sensing means.

8. In a testing apparatus,
a force-receiving member,
a first horizontal beam rigidly supporting the force-receiving member,
a second beam parallel to the first beam,
a pair of parallel links coupled to the first and second beams,
weight means on one end of one of the links to form a pendulum,
a third beam pivotally supported intermediate the ends thereof,
a fourth beam parallel to the first beam,
a third link pivotally connected to one end of each of the third and fourth beams and rigidly connected to the second beam,
a fourth link pivotally connected to the other ends of the third and fourth beams and parallel to the third link,
counterweight means secured to the fourth link,
pendulum means carried rigidly by the third beam,
indicating means operable by movement of the third beam from a horizontal position,
and indicator means carried by the second beam and one of the first pair of links and operable by horizontal movement of the first beam relative to the second beam.

9. In a testing apparatus,
a post,
means mounting the post in a vertical position for turning movement on a vertical axis,
first pendulum means coupled to the post and opposing turning movement of the post,
first indicating means for indicating turning force on the post,
a first beam pivotally supported intermediate the ends thereof by the post at a point on the post intermediate the ends of the post,
a second beam pivotally supported intermediate the ends thereof by the post at the top end of the post,
a first link connected pivotally to one end of each of the first and second beams,
a second link connected pivotally to the other ends of the first and second beams to form a first parallelogram linkage with the beams and the first link,
counterweight means carried by the first link,
second pendulum means carried movably along the scale by the first beam and resisting pivotal movement of the first beam from a horizontal position,
second indicating means for indicating vertical unbalancing forces applied to the second link,
a third beam fixed rigidly to the second link in a horizontal position,
a third link pivotally connected to the third beam,
a fourth link connected pivotally to the third beam,
a fourth beam pivotally connected to the third and fourth links to form a second parallelogram linkage with the fourth beam and the third and fourth links,
third pendulum means fixed to the third link and resisting horizontal movement of the fourth beam relative to the third beam,
third indicating means for indicating horizontal force applied to the fourth beam,
and force-receiving means mounted on the fourth beam.

10. In a testing apparatus,
a post,
means mounting the post in a vertical position for turning movement on a vertical axis,
first pendulum means coupled to the post and opposing turning movement of the post,
a first scale,
a first pointer carried by the post movably along the scale,
a first beam pivotally supported intermediate the ends thereof by the post at a point on the post intermediate the ends of the post,
a second beam pivotally supported intermediate the ends thereof by the post at the top end of the post,
a first link connected pivotally to one end of each of the first and second beams,
a second link connected pivotally to the other ends of the first and second beams to force a first parallelogram linkage with the beams and the first link,
counterweight means carried by the first link,
a third beam fixed rigidly to the second link in a horizontal position,
a second scale carried by the post,
a pendulum carried movably along the second scale by the first beam and resisting pivotal movement of the first beam from a horizontal position,
a third link pivotally connected to the third beam intermediate the ends of the third beam,
a fourth link connected pivotally to the third beam at an end of the third beam,
a fourth beam pivotally connected at the ends thereof to the third and fourth links to form a second parallelogram linkage with the fourth beam and the third and fourth links,
a pendulum weight fixed to the third link and resisting horizontal movement of the fourth beam relative to the third beam,
a third scale carried by the third beam,
a third pointer carried movably along the third scale by the fourth link,
and means carried by the fourth beam for coupling a test object thereto.

11. In a testing apparatus,
a bracket,
a supporting member for carrying an object to be tested,
a lever carried pivotally by the bracket and carrying the supporting member,
a gear sector having a pointer pivotally carried by the bracket,
a scale carried by the bracket,
a link connecting the gear sector and the bracket,
gear means mounted on the bracket for adjusting the gear sector,
and testing means supporting the bracket and responsive to forces applied to the object to be tested.

12. In a testing apparatus,
a bracket,
an airfoil supporting member,
a lever carried pivotally by the bracket and carrying the supporting member, a gear sector having a pointer pivotally carried by the bracket,
a scale carried by the bracket,
a link connecting the gear sector and the bracket,
gear means mounted on the bracket for adjusting the gear sector,
means for supplying wind to an airfoil carried by the supporting member,
and means for measuring forces of the wind on the airfoil.

References Cited by the Examiner

UNITED STATES PATENTS

| | | | |
|---|---|---|---|
| 1,710,135 | 4/1929 | Zahm | 73—147 |
| 1,896,281 | 2/1933 | Breaden | 177—255 X |
| 2,069,908 | 2/1937 | Wells | 308—2 |
| 2,152,388 | 3/1939 | Porter | 308—2 X |
| 2,770,967 | 11/1956 | Du Pont | 73—147 |

LOUIS R. PRINCE, *Primary Examiner.*
DAVID SCHONBERG, *Examiner.*